United States Patent Office

2,979,473
Patented Apr. 11, 1961

2,979,473

MODIFIED ALKYD RESINS WITH 2,4-DIMETHYL BENZOIC ACID

Raymond L. Heinrich, Baytown, Tex., and David A. Berry, Columbus, and Robert L. Christian, Gahanna, Ohio, assignors, by direct and mesne assignments, to Esso Research and Engineering Company, Elizabeth, N.J., a corporation of Delaware No Drawing. Filed Aug. 28, 1958, Ser. No. 757,691

7 Claims. (Cl. 260—22)

This invention relates to modified alkyd resins. More particularly, this invention relates to modified alkyd resins of improved hardness and drying characteristics.

Alkyd resins are widely used in the preparation of surface coating compositions. A particularly desired class of alkyd resins are the so-called "oil-modified" alkyd resins employed in coatings and prepared by the intercondensation of a polybasic acid (preferably dibasic), a polyol, and an unsaturated fatty acid.

The present invention is directed to a discovery in the field of oil-modified alkyd resins which not only permits the inclusion of 2,4-dimethyl benzoic acid as a raw material but which also provides oil-modified alkyd resins of improved physical and chemical properties.

It has now been discovered that alkyd resin compositions of improved physical properties may be obtained by replacing from about 30 to about 70 mol percent of the fatty acid component of the alkyd resin with a monocarboxylic aromatic acid component which contains at least about 50 mol percent (and preferably about 80 to 100 mol percent) of 2,4-dimethyl benzoic acid. In particular, the alkyd resin coating compositions of the present invention are characterized by rapid drying times and the films prepared therefrom are characterized by excellent flexibility, chemical resistance, and hardness.

Alkyd resin chemistry is well known to those skilled in the art and, in the interest of brevity, will not be discussed in detail. The preparation and physical properties of alkyd resins are described in numerous texts, such as vol. I of "Organic Coating Technology," Henry Fleming Payne, John Wiley and Sons, Inc., N.Y., 1954.

Although a wide variety of polybasic acids such as phthalic anhydride, isophthalic acid, succinic acid, 2.2.1-bicyclo endomethylene-7-heptene-2,3-dicarboxylic acid, etc., may be utilized, the preferred acid is generally phthalic anhydride. Similarly, although a wide variety of polyols such as glycerol, trimethylol propane, pentaerythritol, sorbitol, mannitol, etc. may be utilized, the preferred polyol is generally glycerol. The polyol should contain an average of from about 2.5 to about 4.5 hydroxyl groups per molecule and, preferably, about 3 hydroxyl groups per molecule.

A wide variety of unsaturated fatty acids may be utilized in the preparation of modified alkyd resins, the source of the fatty acid normally being a naturally occurring vegetable or marine oil such as linseed oil, soybean oil, tall oil, menhaden oil, tung oil, castor oil, etc.

Frequently, minor amounts of additional components such as maleic anhydride, dimerized or bodied fatty acids, saturated fatty acids, etc. will also be utilized.

In general, the polybasic acid, polyol, and fatty acid are interreacted in proportions sufficient to provide about a 5 to 25 weight percent excess of polyol. Excess polyol may be defined as that amount of polyol in excess of the amount necessary to combine with the sum of the acid groups in the fatty acid and the polybasic acid on a theoretical basis. Alkyd resins are conventionally characterized as short oil modified alkyd resins, medium oil alkyd resins, and long oil alkyd resins, depending upon the ratio of fatty acid to the dibasic acid in the preparation of the resin. Long oil alkyd resins are normally prepared by the interreaction of about 3.1 to about 3.4 mol equivalents of polyol with about 2 mol equivalents of polycarboxylic acid and 1 mol equivalent of unsaturated fatty acid. Progressively larger amounts of polycarboxylic acid and progressively smaller amounts of unsaturated fatty acid are utilized to provide for a shorter oil length. Thus, short oil alkyd resins may be prepared by the intercondensation of about 3.1 to about 3.4 mol equivalents of polyol with about 2.3 to about 2.5 mol equivalents of polycarboxylic acid and from about 0.7 to about 0.5 mol equivalents of unsaturated fatty acid.

Accordingly, the alkyd resin compositions of the present invention may be defined as intercondensation products of about 3.1 to about 3.4 mol equivalents of a polyol containing about 2.5 to 4.5 hydroxyl groups per molecule with about 2 to 2.5 mol equivalents of a polycarboxylic acid and about 1 to about 0.5 mol equivalents of a modifier consisting of about 30 to 70 mol percent of an unsaturated fatty acid and, correspondingly, from about 70 to 30 mol percent of a monocarboxylic aromatic acid component containing from about 50 to 100 mol percent of 2,4-dimethyl benzoic acid. Thus, improved short oil, medium oil and long oil alkyd resins are provided in accordance with the present invention. The improvement is most pronounced with long oil alkyd resins.

When the aromatic monocarboxylic acid component contains less than 100 percent of 2,4-dimethyl benzoic acid, the remainder of the component may be an unsubstituted or substituted aromatic monocarboxylic acid such as benzoic acid, ortho-toluic acid, para-toluic acid, meta-toluic acid, para-isopropyl benzoic acid, para-tertiary butyl benzoic acid, 2,5-dimethyl benzoic acid, etc. or a suitable mixture of two or more such acids.

The invention will be further illustrated by the following specific examples which are given by way of illustration and not as limitations on the scope of this invention.

A plurality of alkyd resins were prepared, utilizing phthalic anhydride, glycerol, an unsaturated fatty acid, and, except for the base resin, an aromatic monocarboxylic acid. In preparing the base resin, about 60 weight percent of fatty acid was utilized. The amount of fatty acid utilized in preparing the other resins was less, the amount used being determined by the extent to which the fatty acid was replaced, on a molar basis, by the aromatic monocarboxylic acid. A 6.7 percent molar excess of glycerol was used in order to obtain equivalent degrees of polymerization.

All of the ingredients were charged at once to a flask fitted with a reflux condenser connected to a Dean-Stark tube. The charge was heated to a temperature of about 450° F. over a 3 to 4 hour period and maintained at this temperature for about 5 to 3 hours. An atmosphere of refluxing xylene vapor was maintained over the cook and vigorous agitation was employed. The final acid number was within the range of about 6.5 to 8.5. Water was azeotropically removed as evolved during the course of the reaction.

EXAMPLE I

In a first series of experiments a plurality of linseed-modified alkyd resins were prepared utilizing, as co-modifiers, a plurality of aromatic monocarboxylic acids. Each resin of the series was prepared in the above-described manner.

In Table I there is listed the aromatic monocarboxylic acid modifiers employed, the extent to which the fatty acid was replaced with the acid modifier on a mol percent basis, and the weight percent of acid modifier utilized, based upon the total charge. In addition, the drying time of the alkyd resins prepared in the above-described fashion is given, together with the hardness of films prepared by drying of the alkyd resin compositions. The drier concentration employed for the air drying tests was about 0.5 weight percent of lead and about 0.05 weight percent of cobalt, based on the weight of the resin solids, and was added to the alkyd resin as a solution of cobalt and lead naphthenate. For the baked film tests, the cobalt salt was employed in an amount sufficient to provide 0.02 weight percent cobalt.

*Table I*

| Acid Modifier | Wt. Percent Added | Mol Percent Equivalent Replacement of Fatty Acid | Dry Time (Tack Free) Hours | Sward Hardness | |
|---|---|---|---|---|---|
| | | | | Baked | Air Dry (21 Days) |
| None | | | 40 | 10 | 16 |
| o-Toluic | 11.7 | 40 | 9 | 24 | 24 |
| p-Toluic | 11.7 | 40 | 8 | 28 | 30 |
| m-Toluic | 11.7 | 40 | 6 | 30 | 32 |
| Do | 14.8 | 50 | 5 | 28 | 28 |
| Do | 18.3 | 60 | 2.5 | 30 | 30 |
| t-Butyl Benzoic | 14.6 | 40 | 2.5 | 38 | 36 |
| 2,5-Dimethyl Benzoic | 12.7 | 40 | 2.5 | 28 | 16 |
| Do | 16.2 | 50 | 2.5 | 26 | 26 |
| Do | 20.1 | 60 | 1.0 | 30 | 26 |
| 2,4-Dimethyl Benzoic | 12.7 | 40 | 3.0 | 28 | 26 |
| Do | 16.2 | 50 | 2.0 | 64 | 40 |
| Do | 20.1 | 60 | 2.5 | 54 | 30 |

From the results obtained, it will be observed that the 2,4-dimethyl benzoic acid-modified compositions containing 50 and 60 mol percent replacement equivalents of fatty acid had superior hardness characteristics as evidenced by the baked and air-dry Sward hardnesses of the resins.

The films were also tested for chemical resistance and flexibility. The unmodified alkyd resin composition had poor chemical resistance. Otherwise, all of the films were essentially equivalent with respect to chemical resistance and flexibility. That is to say, the superior hardness characteristics of the 2,4-dimethyl benzoic acid-modified alkyd resins was not obtained at the expense of flexibility or chemical resistance.

Equivalent results are obtainable with an alkyd resin prepared by first reacting the fatty acid with the polyol to form an alcoholysis product followed by reaction of the alcoholysis product with the mono- and polycarboxylic acid components.

EXAMPLE II

As a further demonstration of the unexpected superiority of 2,4-dimethyl benzoic acid, another series of modified alkyd resin coating compositions were prepared utilizing benzoic acid, para-isopropyl benzoic acid, and para-tertiary butyl benzoic acid. In this instance, however, soya fatty acids were employed. The compositions were prepared in the manner described above. The amount of aromatic monocarboxylic acid modifier employed and the results obtained are set forth in Table II.

*Table II*

| Acid Modifier | Wt. Percent Added | Mol Percent Equivalent Replacement of Fatty Acid | Dry Time (Tack Free) Hours | Sward Hardness | | |
|---|---|---|---|---|---|---|
| | | | | Bake | Air Dry | |
| | | | | | (28 Days) | (14 Days) |
| None | | | <100 | 10 | 2 | |
| Benzoic | 11.8 | 40 | <100 | | | |
| Do | 15.1 | 50 | | | | |
| Do | 19.0 | 60 | | | | |
| p-Isopropyl Benzoic | 15.2 | 40 | 9.5 | 22 | 10 | |
| Do | 18.5 | 50 | 10 | 30 | 20 | |
| Do | 23.9 | 60 | 16 | 30 | 20 | |
| p-t-Butyl Benzoic | 16.3 | 40 | 9 | 20 | 16 | |
| Do | 20.7 | 50 | 7 | 26 | 22 | |
| Do | 25.4 | 60 | 6.5 | 26 | 26 | |
| 2,5-Dimethyl Benzoic | | 40 | 6.5 | 20 | | 16 |
| Do | | 50 | 6.0 | 18 | | 16 |
| Do | | 60 | 5.5 | 30 | | 22 |
| 2,4-Dimethyl Benzoic | | 40 | 4.0 | 28 | 22 | |
| Do | | 50 | 4.0 | 32 | 26 | |
| Do | | 60 | 3.5 | 36 | 32 | |

From Table II, it will be observed that superior results were again obtained through the provision of alkyd resins modified with 2,4-dimethyl benzoic acid.

Having described our invention, what is claimed is:

1. An alkyd resin composition comprising the intercondensation product of about 3.1 to about 3.4 mol equivalents of a polyol containing an average of from about 2.5 to 4.5 hydroxyl groups per molecule with from about 2 to 2.5 mol equivalents of a polycarboxylic acid and, correspondingly, from about 1 to about 0.5 mol equivalents of a modifier component consisting of about 30 to 70 mol percent of an unsaturated glyceride oil fatty acids portion and, correspondingly, about 70 to 30 mol percent of an aromatic monocarboxylic acid portion containing from about 40 to 100 mol percent of 2,4-dimethyl benzoic acid.

2. An alkyd resin coating composition as in claim 1 wherein the polyol is glycerol, the polycarboxylic acid is a phthalic acid, and the fatty acids are linseed fatty acids.

3. An alkyd resin coating composition as in claim 1 wherein the polyol is glycerol, the polycarboxylic acid is a phthalic acid, and the fatty acids are soya fatty acids.

4. An alkyd composition comprising the intercondensation product of about 3.1 to about 3.4 mol equivalents glycerol with from about 2 to 2.5 mol equivalents of phthalic anhydride and, correspondingly, from about 1 to about 0.5 mol equivalents of a modifier component consisting of about 30 to 50 mol percent of an unsaturated glyceride oil fatty acids portion and, correspondingly, about 70 to about 50 mol percent of an aromatic monocarboxylic acid ingredient containing from about 80 to 100 mol percent of 2,4-dimethyl benzoic acid.

5. An alkyd resin composition as in claim 4 wherein the unsaturated fatty acids are linseed fatty acids.

6. An alkyd resin composition as in claim 4 wherein the unsaturated fatty acids are soya fatty acids.

7. An alkyd resin composition as in claim 4 wherein the aromatic monocarboxylic acid ingredient consists of 2,4-dimethyl benzoic acid.

References Cited in the file of this patent

UNITED STATES PATENTS

| 2,606,161 | Marling | Aug. 5, 1952 |
| 2,915,488 | Kraft et al. | Dec. 1, 1959 |